(12) United States Patent
Morgan et al.

(10) Patent No.: US 6,188,962 B1
(45) Date of Patent: *Feb. 13, 2001

(54) CONTINUOUS DATA SEISMIC SYSTEM

(75) Inventors: Paul McDonald Morgan; William Alfred Guyton, both of Sugar Land, TX (US); Kenneth Graeme Williamson, Twickenham (GB)

(73) Assignee: Western Atlas International, Inc., Houston, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/104,905

(22) Filed: Jun. 25, 1998

(51) Int. Cl.[7] ........................................... G01V 1/24
(52) U.S. Cl. ............................ 702/14; 367/20; 367/117
(58) Field of Search ............................ 702/14, 16, 17, 702/18; 367/6, 76, 77, 16, 20, 117

(56) References Cited

U.S. PATENT DOCUMENTS

| | | | |
|---|---|---|---|
| 4,809,005 | * 2/1989 | Counselman, III | 342/352 |
| 5,276,655 | * 1/1994 | Rialan et al. | 367/77 |
| 5,497,356 | * 3/1996 | Norton, Jr. et al. | 367/6 |
| 5,548,562 | * 8/1996 | Helgerud et al. | 367/14 |
| 5,650,981 | * 7/1997 | Jacobsen et al. | 367/19 |
| 5,724,241 | * 3/1998 | Wood et al. | 702/14 |
| 5,978,313 | * 11/1999 | Longaker | 367/38 |
| 6,002,339 | * 12/1999 | Norris | 340/690 |

\* cited by examiner

*Primary Examiner*—Donald E. McElheny, Jr.
(74) *Attorney, Agent, or Firm*—Madan, Mossman & Sriram, P.C.

(57) ABSTRACT

A system for seismic data acquisition has been invented having, in certain aspects, one or multiple distributed data acquisition subsystems that are independent of energy source controller and/or of navigation system operation. Thus the distributed acquisition system(s) do not require a complicated and burdensome interface to the energy source controller or navigation systems. The seismic data acquisition system supplies a continuous flow of data which is buffered within a centralized data repository for short term storage until required by non-real-time processes. A seismic data acquisition method has been invented that replaces conventional closely coupled interaction between seismic acquisition systems and the energy source controller and the navigation systems by utilizing GPS time stamps on both the data as well as cycling events of the energy source controller and/or navigation systems to insure precise association of seismic data with cycling events. By continuously acquiring data with no interruption in the acquired data flow, association with energy source or navigation events may be accomplished at a latter point in time and not in the real-time operation of the acquisition subsystem.

31 Claims, 3 Drawing Sheets

CONTINUOUS DATA SEISMIC SYSTEM

BACKGROUND OF THE INVENTION

1. Field of the Invention

This invention is directed to seismic data acquisition and recording systems and methods; in one aspect, to such systems and methods for recording in a useful and meaningful way all the seismic data related to one or more seismic events, in one aspect without regard to, or synchronization with a navigation system and/or energy source control system; and, in one aspect, to such systems and methods in which acquired data is associated with seismic events at some point in time after the data is acquired.

2. Description of Related Art

In a variety of prior art seismic data systems, only a selected portion of generated seismic signals are recorded. As shown in FIG. 1 a prior art seismic system S is tightly coupled to the actions of a navigation system N and an energy source controller E. The seismic system S includes a data acquisition subsystem A which interfaces with apparatus on seismic cables C and which is slaved to the action of systems N and E. A recording subsystem R is in turn slaved to the data acquisition subsystem A.

The navigation system N receives time and positioning information from a Global Positioning System ("GPS") G. This information indicates the location of the navigation system N. In existing systems the seismic system S and the energy source controller E may be located on separate vessels. Components of the system N and/or of the System G may be distributed over several vessels. These systems provide for the exact positioning of all vessels involved in a seismic survey and, therefore, the physical location of interrelated systems S and E.

In these prior art systems, the navigation system N acts as a master controller of subsystem E and subsystem A, i.e., the system E and subsystem A are, in this sense, dependent on and not independent of the master controller navigation system N. Also, the subsystem E and subsystem A are co-dependent, i.e., they send signals, information, and commands to each other and, in certain instances, do not act without them.

In a typical operation of the system of FIG. 1, the master controller navigation system N, constantly receiving time and position signals from the GPS system G, sends a "start" command to the acquisition subsystem A and, substantially simultaneously, a "start" command to the energy source controller subsystem E. Based on known location, these "start" commands are sent prior to the arrival at a known desired firing point of the system and of the energy source. This pre-firing location (at which initial "start" commands are issued) is chosen so that the E and A subsystems have time to accomplish certain tasks and complete firing of the energy sources at the desired known firing point.

The acquisition subsystem A upon ascertaining that it is ready to acquire and record data, indicates its ability to start an acquisition cycle by issuing a "Fire" command to the energy source controller system E after a fixed delay from the receipt of the "start" command from the navigation system N. The fixed delay is referred to as an Acquisition Synchronization Time and is typically 200 milliseconds. After the system E receives the "Fire" command from subsystem A, the source controller system E sequences its energy sources (typically air guns) in such a manner that the peak power of the array of energy sources is at a maximum at a fixed point in time following the receipt of the Fire command. At this point in time (referred to as TO or Time Break) the energy source controller E issued a Time Break command to the acquisition subsystem A. The time interval from the receipt of the Fire command and issuing of the Time Break command is referred to as Gun Synchronization Time and is typically 128 milliseconds. The subsystem A then begins to acquire data generated by the firing of the seismic energy sources for a fixed period of time (typically 6–8 seconds) referred to as the Acquisition Time. At the completion of the Acquisition Time the acquisition subsystem A will typically inhibit the acceptance of any other start commands from the navigation system N while it logs status and initializes acquisition system components for the next acquisition cycle. This time, which is referred to as the Acquisition System Overhead, typically lasts for approximately 500 milliseconds. During this time the acquisition subsystem A is acquiring and logging status concerning the performance of the acquisition subsystem, synchronizing configuration changes with the multiple CPU's that are contained within the acquisition subsystem and distributing parameters to these various CPU's that will control the actions of the acquisition subsystem A during the next acquisition cycle. Optionally the acquisition subsystem A will start the recording subsystem R process that transfers the acquired seismic data to long term storage on magnetic tape. The acquisition subsystem A does not typically wait for the completion of the recording phase before it is once again able to accept system starts from the navigation system.

If a new start command is issued to the acquisition subsystem A at any point in time during the Acquisition Time or during the Acquisition System Overhead Time the acquisition subsystem will ignore the start command and the next acquisition cycle will not be started. Since this can be a very serious problem, typical operating procedures dictate that the speed of the shooting vessel be adjusted to guarantee that the time interval between consecutive start commands from navigation system N be greater than the sum of the Acquisition Synchronization Time, Gun Synchronization Time, Acquisition Time, and the Acquisition System Overhead has elapsed.

The time interval between consecutive start commands from navigation system N is a function of the speed of the vessel between the fixed locations at which the acquisition subsystem A must be cycled. These fixed locations are known as Shotpoints. The speed of the vessel through the water is, in turn, a function of the vessel propulsion as well as numerous environmental elements that cannot be controlled. These include wind speed and direction, ocean current, and wave action. In order to compensate for these variables a Cycle Delay Time is introduced after the end of the Acquisition Time to insure that the next Start command from the navigation system N is not issued prior to the completion of both the Acquisition Time and the Acquisition System Overhead Time. This Cycle Delay must be greater than the Acquisition System Overhead and allow for the effect on vessel speed caused by environmental elements. Typical values for the Cycle delay are 1.25 seconds.

As shown in FIG. 2 the System Dead Time is the sum of the Cycle Delay, Acquisition Synchronization Time, and Gun Synchronization Time and is typically greater than 1.5 seconds. The productivity of prior art seismic systems is severely reduced by the need to support the System Dead Time interval. For an Acquisition Cycle Time of 6 seconds the effect of the additional 1.5 seconds of dead time reduces production by approximately 25%. Assuming 12.5 Meter Shotpoint intervals the boat speed in this case must be reduced from 4 knots to 3.24 knots to compensate for the System Dead Time. At this speed the cable may become uncontrollable forcing the survey to be done in two passes over the same area with the first pass collecting every other Shotpoint and the second pass collecting the Shotpoints skipped in the first pass. In this case the effect of the System Dead Time reduces production by 50%.

For the interdependent system N, E and subsystems A to work correctly their operations must be temporally synchronized since the systems are interrelated and co-dependent; i.e. they operate and function together in real-time and must do so to be effective in order to implement the temporal synchronization, delays are introduced in the system operation that adversely affect production. During these delay/synchronization periods seismic data is being generated (e.g. by reflections and refractions of a generated acoustic wave field from an earth layer) but must be discarded due to the synchronization delays inherent in the closely coupled system formed by systems N, E, and subsystem A.

There has long been a need for seismic data methods and systems that have reduced or no deadtime, i.e., a system in which most or all generated data is recorded and is, therefore, potentially useful. There has long been a need for seismic data methods and systems in which real-time system/subsystem synchronization are not required.

SUMMARY OF THE PRESENT INVENTION

The present invention, in certain aspects, discloses a seismic data system with independent subsystems. The present invention, in certain aspects, removes the tightly coupled real-time interaction between an acquisition subsystem and a navigation system and an energy source controller system so that dead time is either significantly reduced or totally eliminated, making it possible to acquire and record all or substantially all of the seismic data generated by the system. The present invention, in certain aspects, provides for the post-data-acquisition association of data with seismic events so that the various systems and subsystems need not operate in synchronized fashion in real-time.

In certain embodiments the present invention discloses a continuous seismic system with a data acquisition subsystem, a data server subsystem, and an event processor subsystem. Such a system is relationally interfaced to a navigation system and an energy source controller system. The data acquisition subsystem has a central processing unit and interface circuitry that implements a connection over which seismic data is acquired from distributed seismic sensors. Acquired data is time stamped with a local GPS derived clock that uniquely identifies the data. Data from the data acquisition subsystem is then transferred over an interface to the data server subsystem until needed for recording. The data server subsystem has a CPU and associated interfaces to the data acquisition system over which time stamped seismic data is received as well as to the event processor over which data is transferred when requested. This data is cataloged based on the time stamp of the data and is then recorded into a disk array with fault tolerant capabilities which insure data reliability even in the case of a disk drive failure. The data server subsystem provides a high performance interface with sufficient bandwidth to support simultaneous transfer into the disk array from the data received from a recording subsystem as well as the data provided to the event processor. The event processor has a CPU with a GPS derived clock that is used to time stamp cycling events provided by the navigation system and the energy source controller system. The event processor subsystem requests seismic data from the data server subsystems using the GPS time stamped event and receives stored seismic data from an interface between the event processor and the data server subsystems. The event processor subsystem performs several digital signal processing functions to the seismic data prior to recording the data onto long term media such as magnetic tape via a SCSI interface.

In certain embodiments of the present invention, the data acquisition subsystem and the data server subsystem are completely independent of the navigation system and the energy source controller system. GPS time is used to uniquely identify the data prior to storage in the data server subsystem. GPS time stamps are used to identify events from the navigation and energy source controller systems and are used by the event processor subsystem to associate the recorded data with the actual energy source events in a non-real time process which will not affect the performance of the data acquisition or data server subsystems. Without any interaction between the systems and subsystems there is no synchronization times required or delays introduced to accommodate the complicated interactions between systems as described in certain prior art approaches to seismic data acquisition. Since all of the seismic data is acquired and continuously recorded into the data server subsystem, there is no concept of the end of the acquisition cycle and the associated Acquisition System Overhead Time as required in certain prior art approaches. Since there is no start command issued to the data acquisition subsystem from the navigation subsystem there is no need to introduce the Cycle Delay Time as described for certain prior art approaches. Without the synchronization times and cycle delays found in the prior art seismic data acquisition systems, the dead time in the continuous seismic system is reduced to zero and production increases of 10%, 20% and up to 25% are possible.

The event processor subsystem is introduced in the continuous seismic system to reestablish the association between the cycling events and the seismic data stored in the data server subsystem. The event processor subsystem time tags the Start and Time Break events generated respectively by the navigation system and the energy source controller system. These time tags are stored for later use by the event processor subsystem in requesting data from the data server subsystem. The event processor subsystem implements the conventional tightly coupled real-time interface between the seismic system and the navigation system and energy source controller system in order to maintain compatibility with existing navigation and energy source controller systems. Support of this interface does not impact the performance of the continuous seismic system since the data acquisition subsystem is functioning without any interaction with the event processor subsystem. While the Acquisition Synchronization Time, Gun Synchronization Time and Cycle Delay Times still exist in the continuous seismic system, they are concurrent with useful seismic data acquisition and therefore do not impact production in certain preferred embodiments.

Based upon the time tagged events from the navigation and energy source controller systems, the event processor subsystem requests seismic data from the data server subsystem. The data requested from the data server subsystem can be relative to any of the events time tagged by the event processor subsystem since all of the seismic data is stored in the data server. This allows recording of data that was acquired prior to Time Break which supports recording of pre-cursor data as well as conventional recording which starts at Time Break. Support for non-impulsive energy sources such as vibratory sources is accommodated since all data prior to, during, and after a sweep is available to the event processor subsystem.

Once the appropriate data is selected by the event processor subsystem various optional digital signal processing (DSP) functions such as band-pass filtering, array forming and correlation may be applied to the data prior to recording. Since these DSP functions are performed on the data as a non-real time operation, the variety of DSP operations which may be applied are limited only by the processing capabilities of the event processor subsystem and the storage limitations of the data server subsystem. The event processor subsystem also optionally implements a sampling skew correction to the data prior to recording. Skew correction may be required since data sampled by the data acquisition subsystem is not perfectly synchronized with the Time Break event generated by the energy source controller system. The sample nearest the Time Break signal may have been acquired as much as ±½ of a sample interval from the Time Break command. This sampling error can be reduced to less than 100 microseconds by application of a skew correction filter. The skew correction filter applies an interpolating function that utilizes surrounding data samples to predict the data sample value at the precise time requested by the event processor subsystem.

It is, therefore, an object of at least certain preferred embodiments of the present invention to provide:

New, useful, unique, efficient, nonobvious systems and methods for using all data generated by a seismic data system;

Such systems and methods in which subsystem real-time synchronization is not required; overhead or deadtime is eliminated; and data/event association is accomplished at a time after data acquisition;

Such systems and methods in which an energy source controller subsystem and a data acquisition system are not co-dependent;

Such systems and methods including a processor for interpolating data points if event/data asynchronicity occurs;

Such systems in which events and data are tagged with GPS time and location information for later correlation and use;

Such systems and methods in which a composite seismic record can be assembled for any portion or portions of seismic data related to a series of generated seismic events;

Such systems and methods in which a navigation subsystem is independent of a data acquisition subsystem and, in certain aspects, in which data acquisition subsystem is remote from a navigation subsystem and/or an energy source controller subsystem; and Such systems and method which can acquire and process precursor data, and use it in a meaningful manner.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
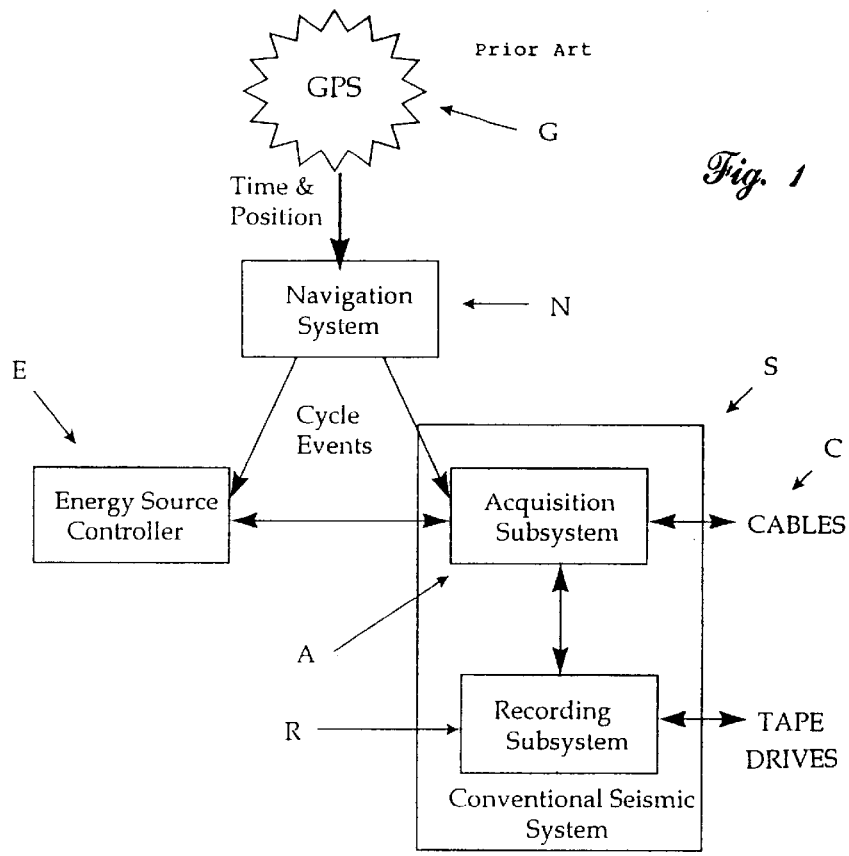
FIG. 1 is a schematic view of a prior art seismic system.
Figure 3:
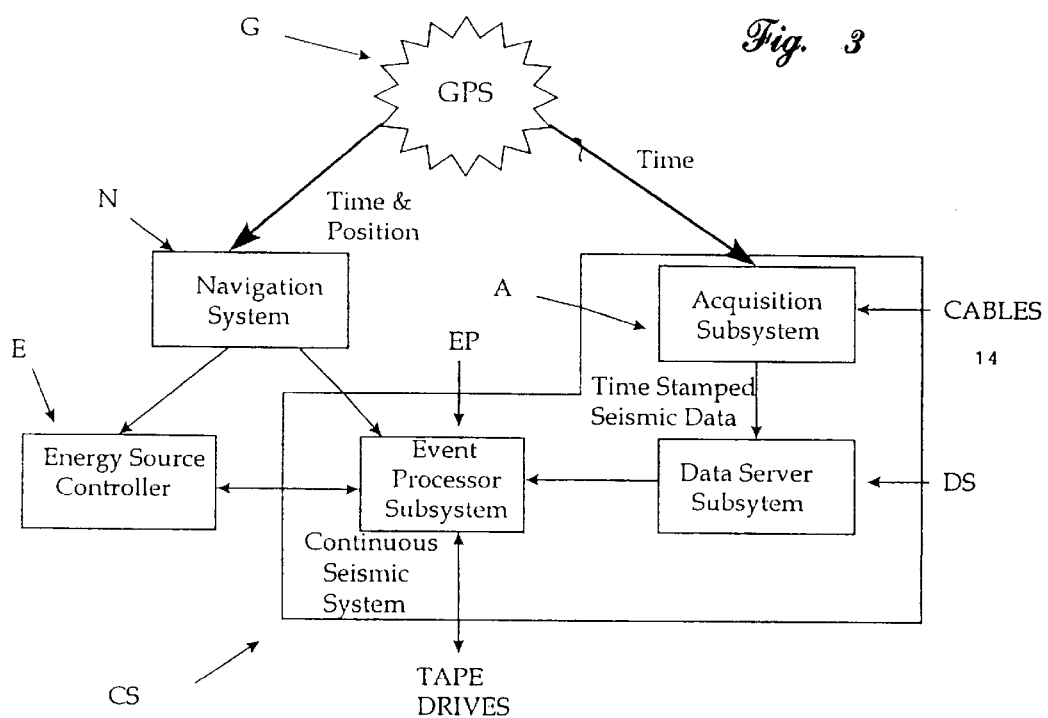
FIG. 3 is a schematic view of a system according to the present invention.
Figure 2:
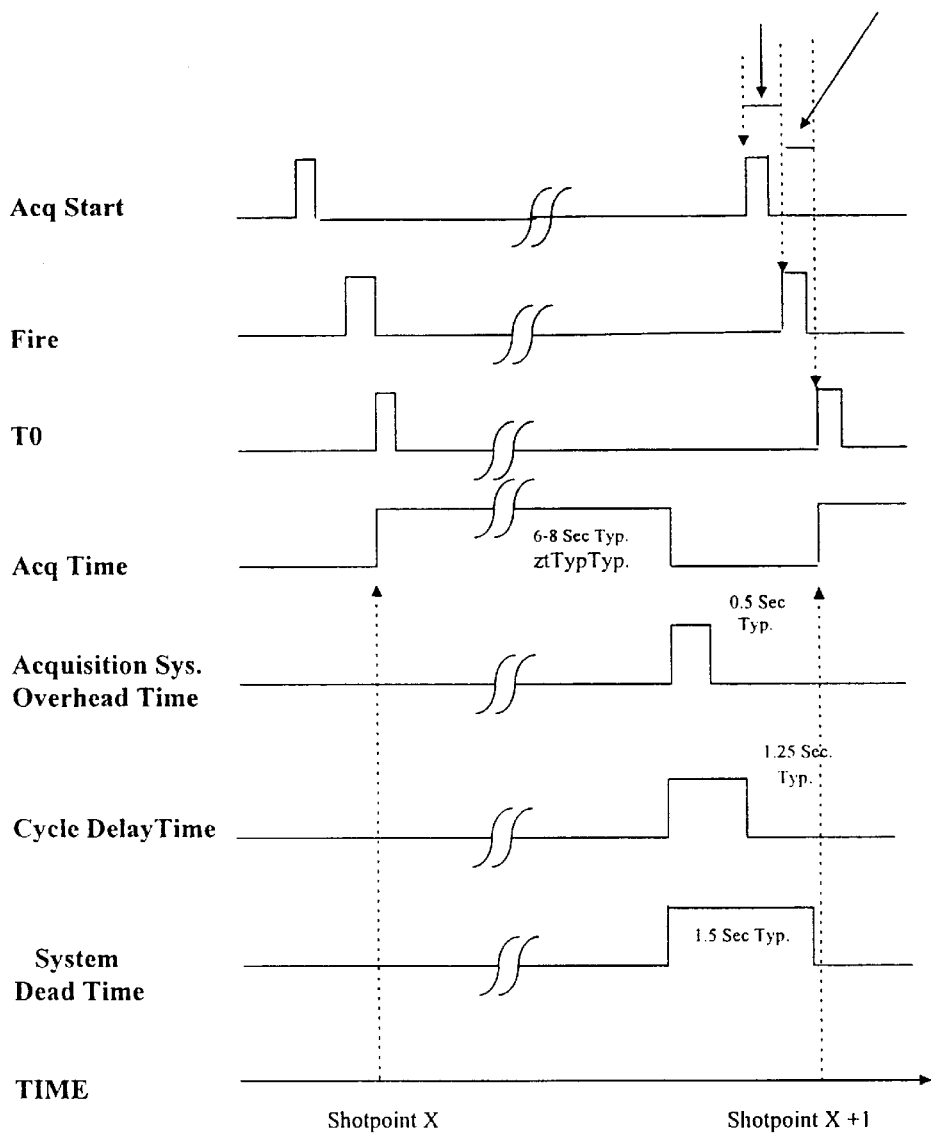
FIG. 2 is a timing diagram of cycling events for a prior art system.
Figure 4:
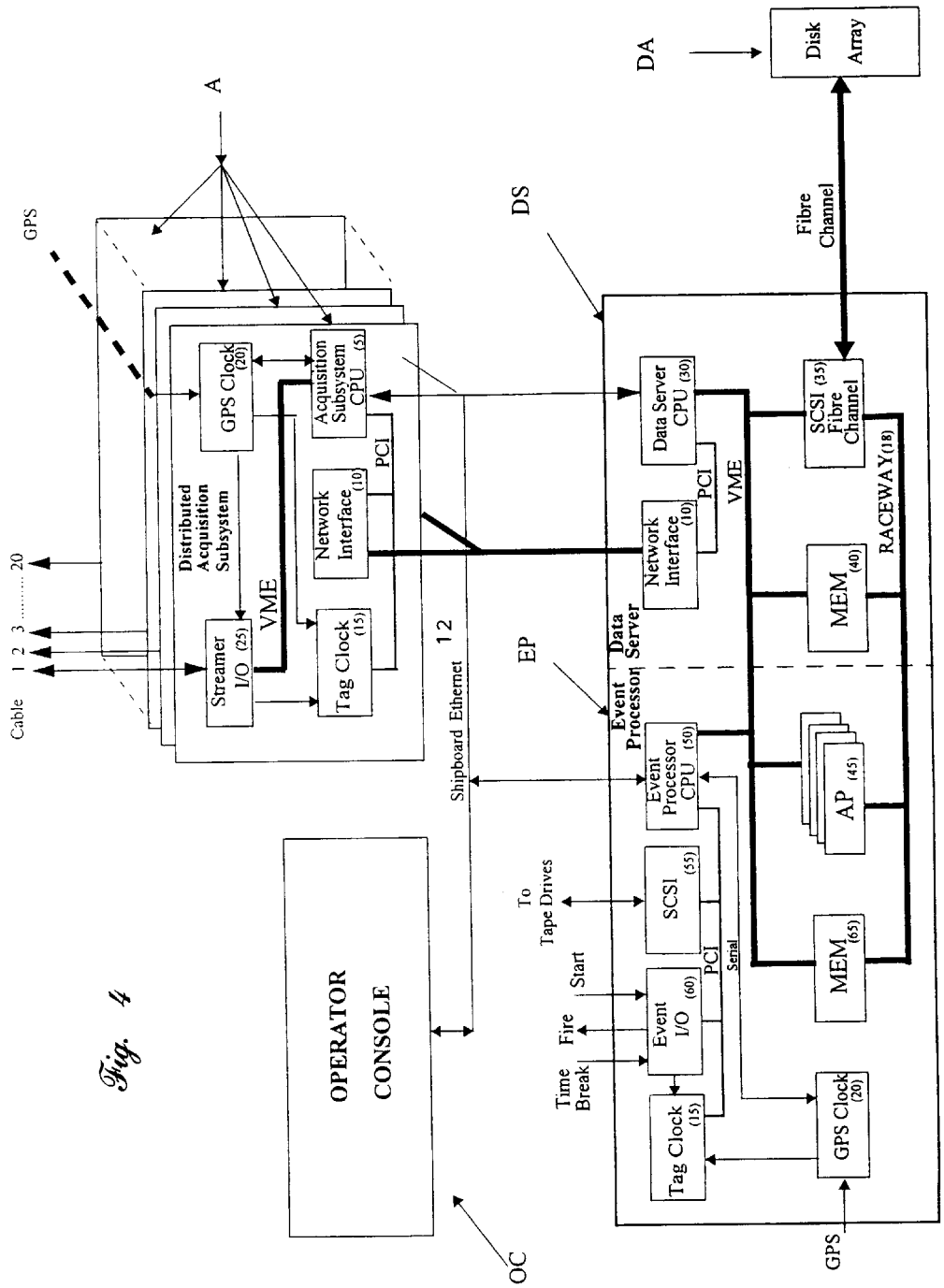
FIG. 4 is a schematic view of a system according to the present invention.

Referring now to FIGS. 3 and 4, a continuous seismic system according to the present invention consists of one or more data acquisition subsystem(s) A, a data server subsystem DS, an event processor subsystem EP, a disk array DA, and an operator console OC. The DS, EP, DA, and OC components are located on the same vessel while the A subsystems may optionally be located on separate vessels. Each subsystem includes appropriate computers programmed to accomplish the various subsystem tasks and appropriate computer peripheral apparatuses, links, electronics and interconnections.

The distributed acquisition subsystem(s) A is controlled by an Acquisition Subsystem CPU 5 which is connected to the other components of subsystem A via a VME or PCI bus. The CPU 5 also supports a connection to a shipboard ETHERNET 12 for control and subsystem status monitoring. The CPU 5 provides memory buffering for the received seismic data and performs several digital signal processing (DSP) operations on the received seismic data including, but not limited to, low-cut filtering, DC offset removal, and root mean square (RMS) analysis prior to sending the data to the DS subsystem. Streamer commands are sent to the cables from a Streamer I/O board 25 and seismic data from the attached streamer cables flow back to the distributed acquisition subsystem(s) via the streamer I/O board 25. The Streamer I/O board generates commands to the cables which cause the transfer of digitized samples of the acoustic data to be transmitted from distributed modules in the attached cables. The commands issued to the cables are phased locked to timing signals originating from a GPS Receiver 20 in each subsystem A. Analog to digital converters in the cables are in turn phased locked to the command issued from the Streamer I/O board 25. In this manner all acquisition elements attached to any data acquisition subsystems A are phased locked to a single high precision time source that originates in the GPS transmitter. Serial data from the cable is converted into single precision IEEE numerical representation prior to being sent to the CPU 5 for transfer to the DS subsystem. GPS Clock 20 derives clocking signals that are used to synchronize its local oven stabilized oscillator to within ±50 nSec of Universal Time Coordinates (UTC) time. A serial interface from the subsystem CPU is used to control and monitor the status of the GPS Clock. The clock derived by the GPS Clock is used by a Tag Clock 15 to maintain logic that is used to associate a time stamp with seismic data received by the Streamer I/O board 25. Time stamped seismic data is transferred to the DS subsystem via a Network Interface 10. The physical implementation of this interface is dependent upon the location of the data acquisition subsystems A and the amount of seismic data that is to be transferred. If the A subsystems are resident on the same vessel as the DS subsystem then conventional wire or fiber interfaces such as ETHERNET, FDDI or Fibre Channel are used to transfer the data. If the subsystem is on a remote vessel, then wireless radio frequency or microwave communication equipment is used to transfer the data.

The data server subsystem DS is controlled by a Data Server Subsystem CPU 30 which is connected to the other components of subsystem DS via a VME or PCI bus. This CPU services requests from the data acquisition subsystems A to store time stamped data onto a disk array DA which is connected to the data server. Likewise the CPU services requests from the event processor subsystem EP to provide specific time stamped data sets from the attached disk array. All access to or from the disk array is controlled by this CPU. This CPU manages the priority of the various requests and favors requests from the A subsystems since they are constrained to operate in real-time. The CPU also supports a connection to the shipboard ETHERNET 12 for control and subsystem status monitoring. The Network Interface 10 is identical to the interface located in the A subsystems. It is used to receive time stamped seismic data from the A subsystems and then to buffer this data in the memory devices on the CPU card. The seismic data is transferred to a dual ported Memory Card 40 for storage on the Disk Array. The 256 Megabyte Memory Card is ported to both the VME as well as the higher performance RACEWAY busses 18. Under control of the DS CPU the SCSI Fibre Channel Interface 35 will transfer the data from the dual ported Memory Card 40 via the RACEWAY bus 18 to the attached Disk Array (DA). The SCSI Fibre Channel card uses a 100 Megabyte per second optical Fibre Channel connection to the disk array over which a SCSI protocol is used to transfer the time stamped seismic data sets. For data requested by the EP subsystem, data is transferred to a Memory Card 65 in the EP subsystem via the RACEWAY bus.

The Disk Array DA, in one aspect, has a 72 Gigabyte array composed of nine (9) Gigabyte disks (8 for data and 1 for parity). By striping data across the array of disks, sustained data transfer rates in excess of 60 Megabytes per second is achieved. Striping is a known procedure used to break a single file into pieces written to multiple drives simultaneously. The interface to the DS subsystem is via a 100 Megabyte per second optical Fibre Channel connection.

The Event Processor subsystem EP is controlled by an Event Processor Subsystem CPU 50 which is connected to the other components of subsystem EP via a VME or PCI bus. The CPU supports both a real-time process for time tagging of various cycling events as well as a non-real-time process which processes and records the seismic data to magnetic tape. The GPS Clock 20 derives clocking signals that are used to synchronize its local oven stabilized oscillator to within ±50 nSec of Universal Time Coordinates (UTC) time. A serial interface from the Event Processor CPU is used to control and monitor the status of the GPS Receiver. The clock derived by the GPS Receiver is used by the Tag Clock 15 to maintain logic that is used to associate a time stamp with cycling events detected by an Event I/O board 55. The real-time process on the CPU maintains a log of cycling events detected by an Event I/O board 60 and stores the sequence and precise time of the occurrence of these events using the clock onboard the Tag Clock 15 for the time tag. In addition the CPU assembles via the ETHERNET 12 connections, information from the Navigation and Energy Source controller that is associated with these events and that are to be recorded along with the seismic data for each Shotpoint. The non-real time process that is executed on the EP CPU 50 uses the log of the cycling events that was built by the real time process to decide what seismic data is to be associated with the events. One algorithm used to decide what data is to be selected for recording is dependent upon various factors such as the type of energy source used to generate the acoustic energy, the start of the data set relative to the energy source event and the number of samples of data required from the relative starting point. The non-real-time process in the Event Processor CPU 50 requests data from the Data Server CPU 30 using the time tag associated with the one of the logged cycling event or a time derived from that value. The Data Server CPU 30 commands the SCSI Fibre Channel 35 board to transfer the requested data from the Disk Array to the Memory 65 board via the RACEWAY bus 18. Since the seismic data acquired by the A subsystems are not synchronized with any of the system cycling events, the time tag used by the EP CPU to request data from the DS subsystem may not be exactly equal to the time stamp that was associated with the seismic data when it was acquired by the data acquisition subsystems A. The DS subsystem returns data to the EP subsystem that is nearest to the requested time. This data therefore could have been digitized up to ±½ of the sample interval from the actual requested time. For typical sample intervals of 2 milliseconds this discrepancy is unacceptable and is corrected by the EP subsystem by skew correcting the data. The skew correction filter applies an interpolating function that utilizes surrounding data samples to predict the data sample value at the precise time requested by the EP subsystem. This same procedure is used to correct all samples of the seismic data record to be recorded. The EP CPU commands a bank of Array Processors 45 to perform this function as well as other optional digital signal processing functions such as correlation if a vibratory energy source is used to generate the acoustic signal. Following all digital signal processing operations the EP CPU 50 generates a Society of Exploration Geophysicists (SEG) compliant tape header using the information that was logged by the EP's real-time process from the Navigation and Energy Source Controller System. The EP transfers the data set from the Memory board 65 via the VME bus to the SCSI interface 55 on the PCI bus, for recording on magnetic tape.

An Operator Console OC is used to configure and control the A, DS, and EP subsystems. The Operator Control Console OC also monitors, limits, checks and logs status from all subsystems and then alerts the operator to abnormal status conditions. The Operator Control Console OC generates various graphical displays that display the real-time data being received by the A subsystems as well as the status of the electrical components within the cables attached to the A subsystems. Operator entered parameters are used to configure the subsystems and to enable or disable selected subsystems. No real-time operations are dependent upon the Operator Control Console OC once it has enabled the A, DS, and EP subsystems. The Operator Control Console OC is implemented, in one aspect, on a UNIX based platform and may be located anywhere on the Shipboard ETHERNET 12.

The present invention, therefore, in certain aspects, provides a seismic data system with a seismic energy source controller system and at least one seismic energy source, a seismic navigation system, at least one seismic data acquisition subsystem for acquiring seismic data, GPS apparatus for associating a GPS time tag to seismic data acquired by the at least one seismic data acquisition subsystem, and the at least one seismic data acquisition subsystem operable independently of signals from the seismic energy source controller; such a seismic data system of wherein the at least one seismic data acquisition subsystem is operable independently of signals from the seismic navigation system; such a seismic data system wherein the at least one seismic data acquisition subsystem is a plurality of seismic data acquisition subsystems; such a seismic data system with a data server subsystem for intermediate storage and retrieval of seismic data acquired by the at least one seismic data acquisition subsystem; any such seismic data system wherein the data server subsystem uses the GPS time tags as an identifying parameter for the acquired seismic data for storage and retrieval; any such seismic data system with an event processor for real-time association of the GPS time tags to cycling events of the seismic data system and for non-real-time association of GPS time tagged acquired seismic data with corresponding GPS time tagged cycling events; any such seismic data system wherein the event processor has processing apparatus for assembling a seismic record relative to GPS time tagged acquired seismic data; any such seismic data system wherein said assembling occurs at a time later than a time of acquisition of the seismic data by the at least one seismic data acquisition subsystem; any such seismic data system wherein the event processor has processing apparatus for re-establishing time synchronization of acquired seismic data with events independent of the at least one seismic data acquisition subsystem; any such seismic data system wherein said re-establishing is done by interpolating filtering to estimate a seismic data value for acquired seismic data relative to a time of specific cycling events; any such seismic data system with an operator console for configuration, control, and monitoring of the at least one seismic data acquisition subsystem and of the data server subsystem; any such seismic data system wherein the at least one seismic data acquisition subsystem has acquisition apparatus with a master oscillator phase locked to a GPS disciplined clock; any such seismic data system wherein the at least one seismic data acquisition subsystem has acquisition apparatus for continuously acquiring seismic data without associated dead time related to seismic energy source events initiated by the at least one seismic energy source; any such seismic data system wherein the at least one seismic data acquisition subsystem has acquisition apparatus for continuously acquiring seismic data without associated dead time related to navigation system events of the seismic navigation system.

The present invention, therefore, in certain aspects, discloses a seismic data system with a seismic energy source controller system and at least one seismic energy source, a seismic navigation system, at least one seismic data acquisition subsystem for acquiring seismic data, GPS apparatus for associating a GPS time tag to seismic data acquired by the at least one seismic data acquisition subsystem, and wherein the at least one seismic data acquisition subsystem is operable independently of signals from the seismic navigation system.

The present invention, therefore, in certain aspects, discloses a seismic system with at least one seismic data acquisition subsystem for acquiring seismic data, GPS apparatus for associating a GPS time tag to seismic data acquired by the at least one seismic data acquisition subsystem, and wherein the at least one seismic data acquisition subsystem operable independently of command signals from any seismic navigation system.

The present invention, therefore, in certain aspects, discloses a seismic system with at least one seismic data acquisition subsystem for acquiring seismic data, GPS apparatus for associating a GPS time tag to seismic data acquired by the at least one seismic data acquisition subsystem, and wherein the at least one seismic data acquisition subsystem operable independently of command signals from any seismic energy source controller.

The present invention, therefore, in certain aspects, discloses a seismic data system with a seismic energy source controller system and at least one seismic energy source, a seismic navigation system, a plurality of seismic data acquisition subsystems for acquiring seismic data, GPS apparatus for associating a GPS time tag to seismic data acquired by the at least one seismic data acquisition subsystem, the at least one seismic data acquisition subsystem operable independently of signals from the seismic energy source controller, the at least one seismic data acquisition subsystem is operable independently of signals from the seismic navigation system, a data server subsystem for intermediate storage and retrieval of seismic data acquired by the seismic data acquisition subsystems, the data server subsystem able to use the GPS time tags as an identifying parameter for the acquired seismic data for storage and retrieval, an event processor for real-time association of the GPS time tags acquired seismic data to cycling events of the seismic data system and for non-real-time association of GPS time tagged acquired seismic data with corresponding GPS time tagged cycling events, an operator console for configuration, control, and monitoring of the seismic data acquisition subsystems and of the data server subsystem, and the seismic data acquisition subsystems having acquisition apparatus for continuously acquiring seismic data without associated dead time related to seismic energy source events initiated by the at least one seismic energy source.

The present invention, therefore, discloses a seismic data method including generating seismic data with a seismic energy system, controlling the seismic energy system with an energy controller system, navigating the seismic energy system with a seismic navigation system, acquiring seismic data generated by the seismic energy system with a data acquisition system, receiving GPS information with data system reception apparatus in the data acquisition system, and the data acquisition system acquiring seismic data independently of signals from the seismic navigation system; such a seismic data method including the data acquisition system acquiring seismic data independently of signals from the energy controller system; such a method including continuously recording with recording apparatus in the data acquisition system seismic data generated by the seismic energy system; such a method including assembling a seismic record including seismic data acquired by the data acquisition system, the assembly done by processing apparatus for assembly of a seismic record including at least a selected portion of the seismic data acquired by the data acquisition subsystem, said assembly occurring at a time later than a time of acquisition of the seismic data; such a method wherein the seismic data generated by the energy subsystem includes precursor data and the seismic data system further comprises apparatus in the data acquisition system for acquiring precursor data, the method including acquiring precursor data; such a method wherein the data acquisition subsystem has interpolation apparatus for providing theoretical data points between at least two known data points related to actual seismic data acquired by the data acquisition subsystem and the method including interpolating a theoretical data point between the at least two known data points related to actual seismic data acquired by the data acquisition system and such a method wherein the at least two known data points are a plurality of data points and the method includes interpolating a plurality of theoretical data points, each of the plurality of theoretical data points between two of the plurality of known data points.

The present invention provides, therefore, in certain aspects a seismic data method for acquiring and processing seismic data with a seismic data system that has a plurality of seismic data acquisition subsystems operable independently of signals from a seismic energy source controller subsystem controlling an energy source and from a seismic navigation system and operable asynchronously with respect to the seismic energy source controller subsystem and the seismic navigation system, the method including continuously acquiring seismic data with the plurality of seismic data acquisition subsystems; such a method wherein the seismic data system includes apparatus for applying GPS tagging information to acquired seismic data and to energy source events, the method including GPS tagging the acquired seismic data, and GPS tagging signals representative of the energy source events; any such method wherein the seismic data system includes an event processor for real-time association of the GPS time tags to cycling events of the seismic data system and for non-real-time association of GPS time tagged acquired seismic data with corresponding GPS time tagged cycling events and the method includes associating GPS tagged acquired data with the GPS tagged signals; any such method including conducting the association in non-real-time; any such method wherein the seismic data system includes apparatus for applying GPS tagging information to acquired seismic data and to navigation system events, the method including GPS tagging the acquired seismic data, and GPS tagging signals representative of the navigation system events; any such method wherein the seismic data system includes an event processor for real-time association of the GPS time tags acquired seismic data to cycling events of the seismic data system and for non-real-time association of GPS time tagged acquired seismic data with corresponding GPS time tagged cycling events and the method including associating GPS tagged acquired data with the GPS tagged signals; any such method including conducting the association in non-real-time; any such method including a step with an event processor for real-time association of the GPS time tags acquired seismic data to cycling events of the seismic data system and for non-real-time association of GPS time tagged acquired seismic data with corresponding GPS time tagged cycling events, and wherein said assembling occurs at a time later than a time of acquisition of the seismic data by the at least one seismic data acquisition subsystem, the method including assembling a seismic record with the event processor with a portion of selected acquired seismic data at a time later than a time of acquisition of the seismic data; any such method wherein the event processor further comprises processing apparatus for re-establishing time synchronization of acquired seismic data with events independent of the at least one seismic data acquisition subsystem, the method including re-establishing time synchronization of the acquired seismic data with the events independent of the plurality of seismic data acquisition subsystems; and any such method wherein said re-establishing is done by interpolating filtering to estimate a seismic data value for acquired seismic data relative to a time of specific cycling events.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112.

What is claimed is:

1. A seismic data system comprising:
   at least one seismic energy source having a GPS start time controlled by a seismic navigation system;
   a seismic data acquisition subsystem for acquiring seismic precursor data, the precursor data comprising seismic reflections generated by the at least one seismic source;
   GPS apparatus for providing current GPS time; and
   an interface for continuously transmitting acquired seismic data and current GPS time to a data server, wherein the seismic data acquisition subsystem is operable independently of the GPS event start time for at least one seismic source.

2. A seismic data system comprising:
   at least one seismic data acquisition subsystem for continuously acquiring seismic data generated by a seismic source having a GPS start time controlled by a seismic navigation system, the seismic data comprising reflected precursor data;
   GPS apparatus for providing current GPS time tags for seismic data acquired by the at least one seismic data acquisition subsystem; and
   an interface for continuously transmitting acquired seismic data and associated GPS information to a recording system wherein the at least one seismic data acquisition subsystem is operable for acquiring seismic precursor data and transmitting data to a data server, independently of the GPS event start time.

3. A seismic data acquisition system comprising:
   a seismic navigation system for controlling a GPS start time for at least one seismic energy source;
   a plurality of seismic data acquisition subsystems for acquiring seismic data, GPS apparatus for associating a GPS time tag to seismic data acquired by at least one of the seismic data acquisition systems;

at least one of the seismic data acquisition subsystems operable independently of the start time of the seismic source;

a data server subsystem for intermediate storage and retrieval of seismic data acquired by the seismic data acquisition subsystems, the data server subsystem able to use the GPS time tags as an identifying parameter for the acquired seismic data for storage and retrieval;

an event processor for non-real-time association of GPS time tagged acquired seismic data with corresponding GPS time tagged cycling event times;

an operator console for configuration, control, and real time monitoring of seismic data acquisition subsystems; and the seismic data acquisition subsystems further comprising acquisition apparatus for continuously acquiring seismic data without associated dead time related to seismic energy source events initiated by the at least one seismic energy source.

4. A data reduction method comprising the steps of:

continuously recording geophysical seismic data independent of a GPS start time for a seismic event;

continuously recording the current GPS time along with the continuously recorded geophysical seismic data as GPS time stamp information; and selecting a portion of the continuously recorded geophysical data recorded between a first earlier GPS time and a second later GPS time wherein the data record selected comprises a reconstruction of data recorded before and after the seismic event.

5. A seismic data method for acquiring and processing seismic data with a seismic data system comprising a plurality of seismic data acquisition subsystems operable independently of signals from a seismic navigation subsystem controlling an energy source start time and operable asynchronously with respect to the seismic navigation system, the method comprising the steps of: continuously acquiring seismic data independently of the energy source GPS start time with the plurality of seismic data acquisition subsystems; and continuously transmitting the acquired data to a server system.

6. The method of claim 5 wherein the seismic data system includes apparatus for applying current GPS time tagging information to the acquired seismic data and to energy source events, the method further comprising the steps of:

tagging the acquired seismic data with current GPS time; and tagging signals representative of the energy source events with current GPS time.

7. The method of claim 6 wherein the seismic data system includes an event processor for real-time association of the current time tags to seismic events of the seismic data system and for non-real-time association of GPS time tagged acquired seismic data with corresponding GPS time tagged cycling events, the method further comprising the step of:

associating GPS tagged acquired seismic data with the GPS tagged signals.

8. The method of claim 7 further comprising the step of:

conducting the association of GPS tagged acquired seismic data with GPS tagged signals in non-real-time.

9. The method of claim 5 wherein the seismic data system includes the steps of:

applying GPS tagging information to acquired seismic data and to navigation system events;

GPS tagging the acquired seismic data; and

GPS tagging signals representative of the navigation system events.

10. The method of claim 9 wherein the seismic data system includes an event processor for real-time association of the GPS time tags acquired seismic data to cycling events of the seismic data system and for non-real-time association of GPS time tagged acquired seismic data with corresponding GPS time tagged cycling events and the method further comprising associating GPS tagged acquired data with the GPS tagged signals.

11. The method of claim 10 further comprising conducting the association of GPS tagged acquired seismic data with GPS tagged signals in non-real-time.

12. A method for acquiring seismic data comprising:

generating seismic data with a seismic energy system having a seismic energy source;

controlling a seismic energy source GPS start time with a seismic navigation system;

navigating the seismic energy system with a seismic navigation system;

continuously acquiring seismic data generated by the seismic energy system with a data acquisition system;

receiving current GPS time with a data system reception apparatus in the data acquisition system; and selectively recording seismic data independently of the seismic navigation system GPS start time.

13. The seismic data method of claim 12 wherein the data acquisition system continuously acquires seismic data independently of signals from the seismic navigation system.

14. The method of claim 13 further comprising:

continuously transmitting seismic data acquired by the data acquisition system to a data server from the data acquisition system.

15. The method of claim 13 further comprising:

assembling on a tape recorder a seismic record including seismic data acquired by the data acquisition system, the assembly performed by a processing apparatus for assembly of a seismic record including at least a selected portion of the seismic data acquired by the data acquisition subsystem between a first GPS time and a second GPS time, the assembly occurring at a time later than a time of acquisition of the seismic data.

16. The method of claim 13 further comprising a step with an event processor for real-time association of the GPS time tags acquired seismic data to cycling events of the seismic data system and for non-real-time association of GPS time tagged acquired seismic data with corresponding GPS time tagged cycling events, and wherein said assembling occurs at a time later than a time of acquisition of the seismic data by the at least one seismic data acquisition subsystem, the method further comprising assembling a seismic record on a tape recorder with the event processor with a portion of selected acquired seismic data at a time later than a time of acquisition of the seismic data.

17. The method of claim 16 wherein the event processor further comprises processing apparatus for re-establishing time synchronization of acquired seismic data with events independent of the at least one seismic data acquisition subsystem, the method further comprising re-establishing time synchronization of the acquired seismic data with the events independent of the plurality of seismic data acquisition subsystems.

18. The method of claim 17 wherein the re-establishing is done by interpolating to estimate a seismic data value for acquired seismic data relative to a time of specific cycling events.

19. A seismic data system comprising:
- at least one seismic energy source, having a GPS start time controlled by a seismic navigation system;
- at least one seismic data acquisition subsystem for acquiring seismic precursor data, the seismic precursor data comprising seismic reflections generated by at least one seismic source;
- GPS apparatus for providing current GPS time;
- the at least one seismic data acquisition subsystem for continuously acquiring seismic data and current GPS time, independent of the GPS start time of the seismic energy source; and
- an interface for continuously transmitting acquired seismic data and GPS time from the data acquisition subsystem to a data server.

20. The seismic data system of claim 19 wherein the the at least one seismic data acquisition subsystem is operable independently of GPS time signals from the seismic navigation system.

21. The seismic data system of claim 19 wherein the at least one seismic data acquisition subsystem comprises a plurality of seismic data acquisition subsystems.

22. The seismic data system of claim 19 wherein an event processor, independent of the at least one data acquisition system uses the GPS time tags as an identifying parameter for the acquired seismic data for retrieving data from the data server.

23. The seismic data system of claim 22 wherein the event processor performs non-real-time association of GPS time tagged acquired seismic data with corresponding GPS time tagged cycling events.

24. The seismic data system of claim 23 wherein the event processor further comprises a processing apparatus for assembling on a single volume, a seismic record relative to GPS time tagged acquired seismic data.

25. The seismic data system of claim 23 wherein the event processor further comprises a processing apparatus for re-establishing time synchronization of acquired seismic data with seismic events.

26. The seismic data system of claim 25 wherein said re-establishing is done by temporal interpolation filtering between two GPS time tagged seismic data acquisition samples temporally surrounding a specific time requested by the event processor to estimate a seismic data value for acquired seismic GPS data at the specific time of specific cycling events.

27. The seismic data system of claim 19 further comprising:
- an operator console for configuration, control, and real time monitoring of the at least one seismic data acquisition subsystem or a seismic sensor.

28. The seismic data system of claim 19 wherein the seismic data acquisition subsystem further comprises an acquisition apparatus with a master oscillator phase locked to a GPS disciplined clock.

29. A The seismic data system of claim 19 wherein the at least one seismic data acquisition subsystem further comprises an acquisition apparatus for continuously acquiring seismic data without associated dead time related to seismic energy source events initiated at GPS event start times by the at least one seismic energy source.

30. The seismic data system of claim 19 wherein the seismic data acquisition subsystem further comprises an acquisition apparatus for continuously acquiring seismic data without associated dead time related to navigation system events of the seismic navigation system.

31. The seismic data system of claim 19 further comprising:
- a processor for performing real time monitoring one of the at least one seismic data acquisition subsystem or a seismic sensor.

* * * * *